United States Patent
Chiang et al.

(10) Patent No.: US 7,207,813 B1
(45) Date of Patent: Apr. 24, 2007

(54) CONNECTOR FOR COUPLING A DATA COMMUNICATION SOCKET WITH A COMPUTER'S PERIPHERAL DEVICE

(75) Inventors: Hsiao-Lung Chiang, Taipei (TW); Yu-Chih Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 11/428,784

(22) Filed: Jul. 5, 2006

(30) Foreign Application Priority Data

May 8, 2006 (TW) .............................. 95116187 A

(51) Int. Cl.
*H01R 13/44* (2006.01)
(52) U.S. Cl. ................... 439/148; 439/528; 439/529
(58) Field of Classification Search ............. 439/148, 439/528, 529, 354
See application file for complete search history.

(56) References Cited

U.S. PATENT DOCUMENTS

| 5,637,002 | A * | 6/1997 | Buck et al. ................ 439/148 |
| 6,309,247 | B1 * | 10/2001 | Wang ......................... 439/521 |
| 6,369,798 | B1 * | 4/2002 | Yatsu et al. ................ 345/167 |
| 2006/0176277 | A1 * | 8/2006 | Daniel et al. .............. 345/163 |

* cited by examiner

*Primary Examiner*—Tho D. Ta

(57) ABSTRACT

A connector is provided for coupling a computer peripheral device with a RJ11 or RJ45 data communication socket. The computer peripheral device has a rectangular recess. The connector includes an elongated main body including a first terminal and a second terminal. The first terminal has a shape mating with the data communication socket. The second terminal has a shape mating with the rectangular recess of the computer peripheral device. As a consequence, the computer peripheral device is attached onto the notebook computer in a cost-effective manner.

6 Claims, 7 Drawing Sheets

CONNECTOR FOR COUPLING A DATA COMMUNICATION SOCKET WITH A COMPUTER'S PERIPHERAL DEVICE

FIELD OF THE INVENTION

The present invention relates to a connector, and more particularly to a connector for coupling a data communication socket with a computer's peripheral device.

BACKGROUND OF THE INVENTION

In modern society, notebook computers are increasingly used because they are portable and convenient. For most notebook computers, a touch pad is used as the input device.

Furthermore, in order to comply with the user's habit, a mouse is also served as the input device of the notebook computer. Especially when the notebook computer is used in the office, the mouse becomes an essential peripheral device.

In a case that the notebook computer needs to be used in other places, for example in a conference room, the user should carry the corresponding mouse at the same time. In other words, since the mouse and the mouse are separate components, the probability of falling down the mouse is increased during the process of carrying the notebook computer along with the mouse.

For a purpose of solving such a problem, a mouse attachable to the notebook computer is disclosed in U.S. Pat. No. 6,784,870, entitled "Portable computer system including detachable peripheral device and combined mouse/joystick for use with same", and the contents of which are hereby incorporated by reference. Please refer to FIG. 1. The notebook computer having a detachable mouse as shown in U.S. Pat. No. 6,784,870 comprises a notebook computer 10, a mouse body 20 and a coupling mechanism 30. By means of the coupling mechanism 30, the mouse body 20 is attached to the notebook computer 10.

Another design for attaching the mouse onto the notebook computer is disclosed in Taiwanese Patent No. 398642, entitled "Device for storing a mouse within the casing of a computer", and the contents of which are hereby incorporated by reference. Please refer to FIG. 2. As shown in Taiwanese Patent No. 398642, the notebook computer 40 has a receptacle 50 for storing the mouse 60 therein Depending on the type of the mouse, however, the coupling mechanism for attaching or storing the mouse is varied. In other words, different types of mice fail to be attached onto a same type of notebook computer, and thus the coupling mechanism is not user-friendly.

For further solving the above drawbacks, a new approach was disclosed in a co-pending Taiwanese Patent Application No. 94143533, entitled "Mouse having a storable hook module", which was filed by the same assignee of the present application on Dec. 29, 2005, and the contents of which are hereby incorporated by reference.

Please refer to FIG. 3. The Mouse having a storable hook module as shown in Taiwanese Patent Application No. 94143533 comprises a hook module 70, which is storable within the mouse. A lock hole 80, which is commonly arranged in a notebook computer as a standard accessory, is also shown in FIG. 3. The lock hole 80 is referred as a "Kensington lock hole". In a case that a lock is attached to the lock hole 80, the notebook will be fixed to any immovable object such as a desk, thereby reducing the chance of the notebook being stolen. Generally, notebook computers exhibited in the computer center or the exhibition place are locked in these lock holes. According to the disclosure of Taiwanese Patent Application No. 94143533, the hook module 70 may be attached onto the notebook computer by hooking a hooking part on the lock hole 80. The design of FIG. 3 is applicable to many types of notebook computers because the Kensington lock hole is a common accessory for most notebook computers.

Although the design of FIG. 3 may facilitate attaching a mouse onto a notebook computer and overcome the problems as described in FIGS. 1 and 2, there are still some drawbacks. For example, since the hook module 70 includes many components, the process of assembling the hook module 70 is complicated and the fabricating cost is increased. In addition, for storing the hook module 70 within the mouse, a receptacle is required and the overall volume of the mouse is also increased.

In views of the above-described disadvantages of the prior art, the applicant keeps on carving unflaggingly to develop a connector for facilitating attaching a mouse onto a notebook computer according to the present invention through wholehearted experience and research.

SUMMARY OF THE INVENTION

It is an object of the present invention to provide a connector for coupling a RJ11 or RJ45 data communication socket of a notebook computer with a mouse so as to facilitate attaching the mouse onto the notebook computer.

In accordance with an aspect of the present invention, there is provided a connector for coupling a computer peripheral device with a RJ11 or RJ45 data communication socket. The computer peripheral device has a rectangular recess. The connector comprises an elongated main body including a first terminal and a second terminal. The first terminal has a shape mating with the data communication socket and includes a first surface and a second surface parallel with each other. The first surface has a resilient arm thereon and the second surface has a resilient arm therein. The second terminal has a shape mating with the rectangular recess of the computer peripheral device, and includes four lateral sides, wherein every two adjacent ones of the four lateral sides are substantially perpendicular to each other.

In an embodiment, each of two lateral sides of the second terminal further comprises two ribs.

In an embodiment, each of the other two lateral sides of the second terminal further comprises a resilient sheet including a hooking part.

In an embodiment, the main body further comprises a protruding periphery between the first terminal and the second terminal.

Preferably, the connector is integrally formed into one piece.

In an embodiment, the computer peripheral device is a mouse.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
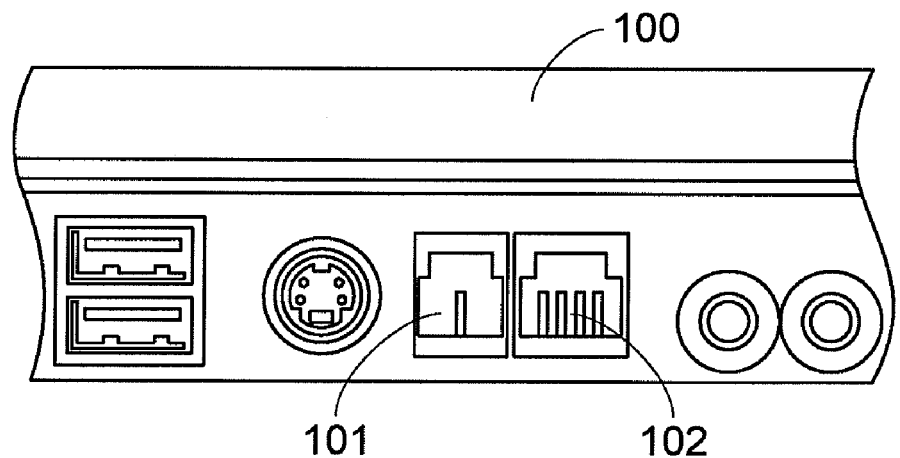
FIG. 4 is a schematic side view illustrating the RJ11 port and the RJ45 port of a typical notebook computer.

Referring to FIG. 4, a schematic side view of a typical notebook computer is illustrated. The notebook computer 10 of FIG. 4 includes two data communication sockets 101 and 102. The data communication socket 101 is a RJ11 port communicated with a modem. The data communication socket 102 is a RJ45 port to be communicated with the local area network.

Figure 5:
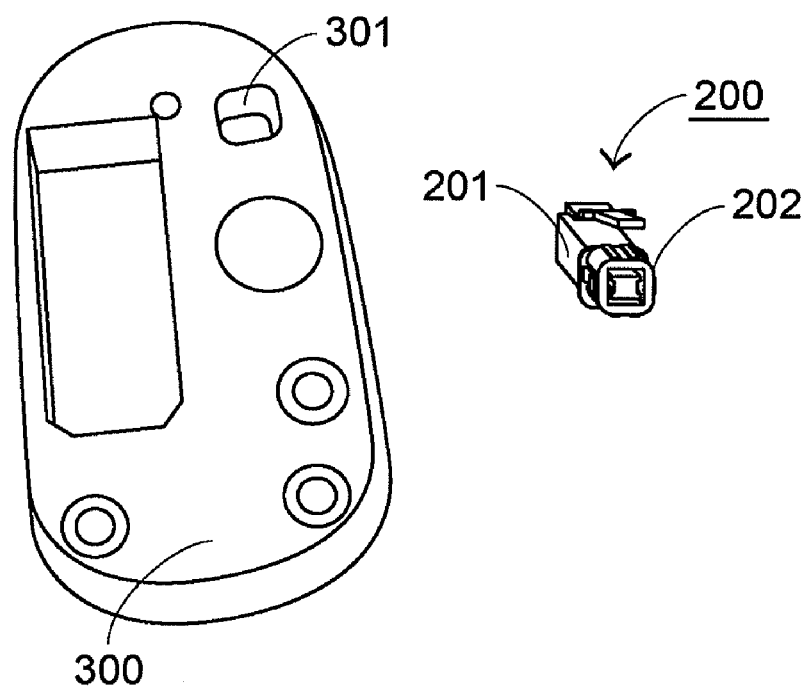
FIG. 5 illustrates a connector used in a mouse according to a preferred embodiment of the present invention.

Please refer to FIG. 5, which illustrates a connector used in a mouse according to a preferred embodiment of the present invention. The connector 200 includes a first terminal 201 and a second terminal 202. The mouse 300 has a recess 301. For facilitating attaching the mouse 300 onto the notebook computer 100, the first terminal 201 of the connector 200 is inserted into the RJ11 port 101 or the RJ45 port 102 of the notebook computer 100, and the second terminal 202 of the connector 200 is inserted into the recess 301 of the mouse 300.

Figure 6:
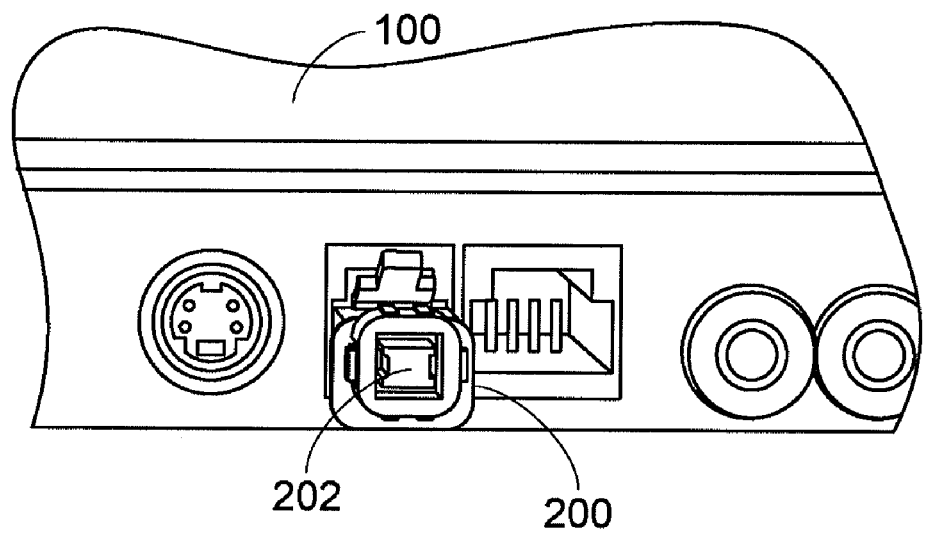
FIG. 6 schematically illustrates that the connector of the present invention is inserted into a RJ11 port of a notebook computer.
Figure 7:
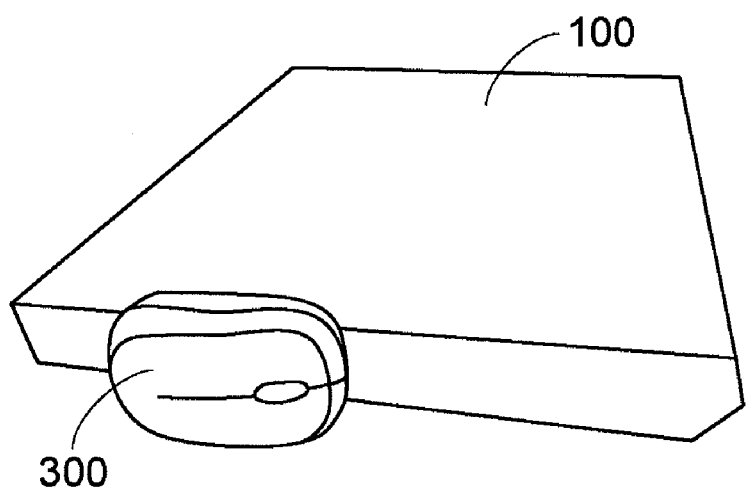
FIG. 7 schematically illustrates that the mouse is attached onto the notebook computer via the connector of the present invention.

The process of attaching the mouse 300 onto the notebook computer 100 will be illustrated with FIG. 6 and FIG. 7. Firstly, the first terminal 201 of the connector 200 is inserted into the RJ11 port 101 of the notebook computer 100. After the second terminal 202 of the connector 200 is inserted into the recess 301 of the mouse 300, the mouse 300 is attached onto a sidewall of the notebook computer 100, as is shown in FIG. 7.

Figure 1:
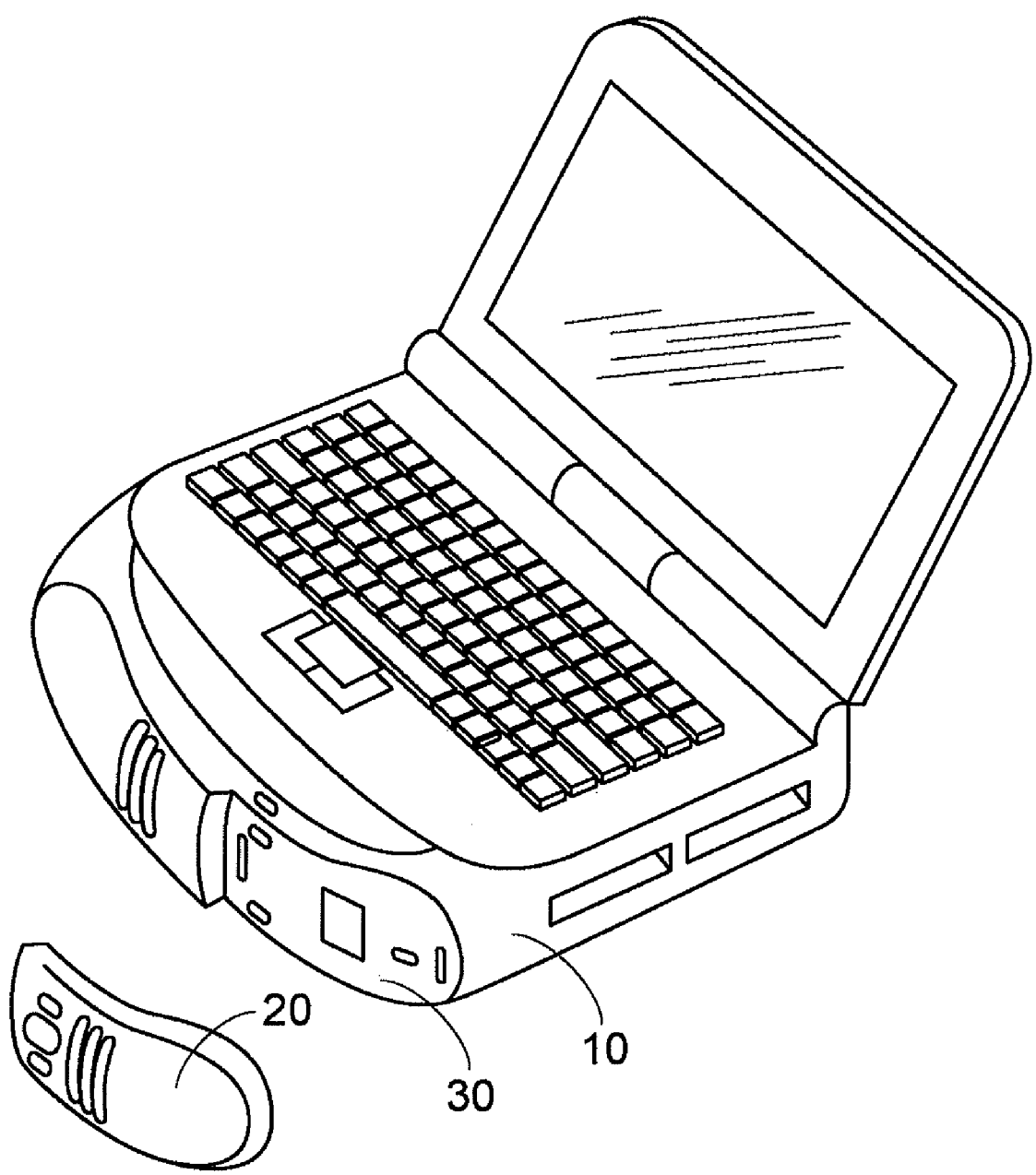
FIG. 1 is a schematic view of a notebook computer having an attachable mouse, which is disclosed in U.S. Pat. No. 6,784,870.
Figure 2:
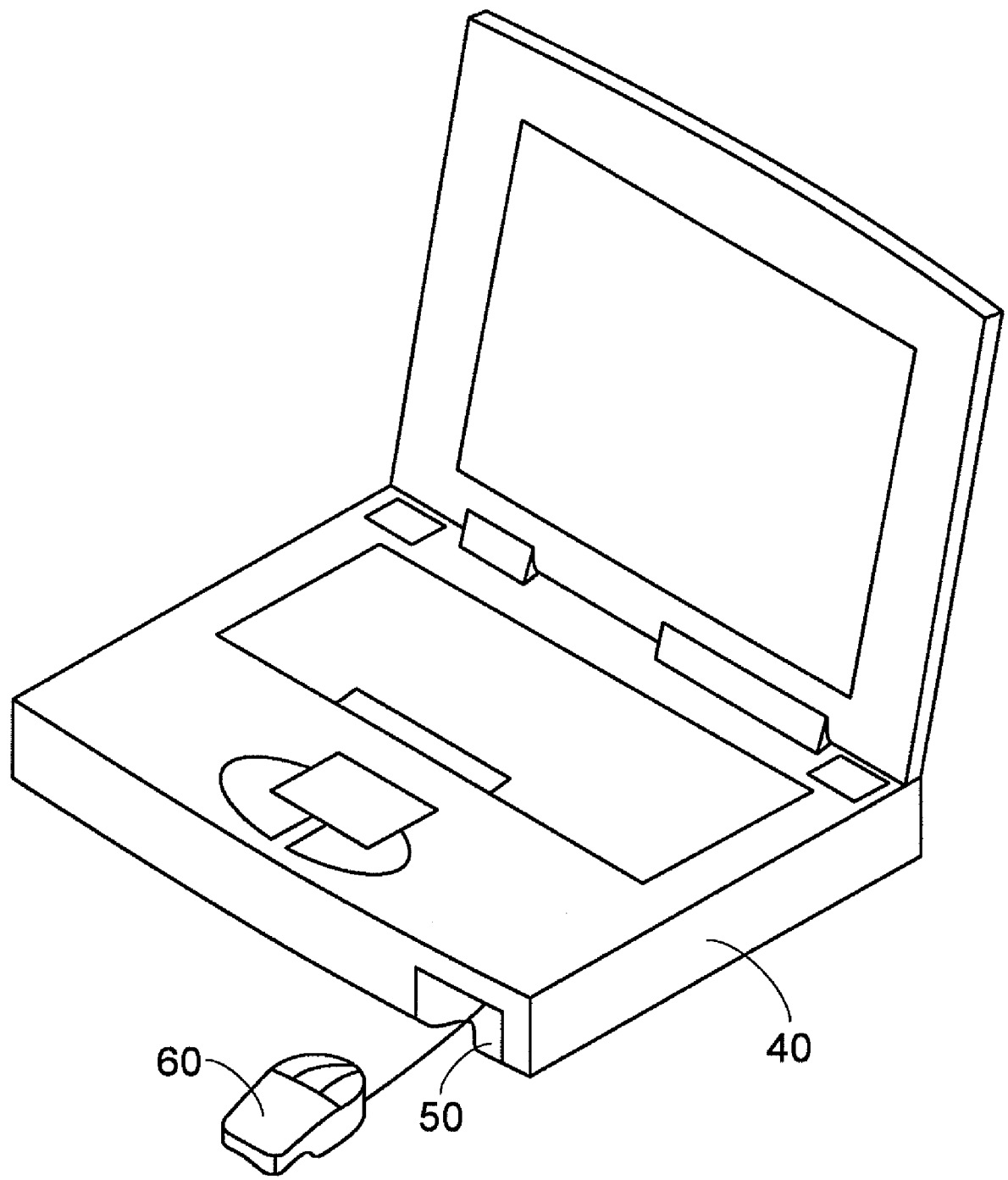
FIG. 2 is a schematic view of another notebook computer having an attachable mouse, which is disclosed in Taiwanese Patent No. 398642.
Figure 3:
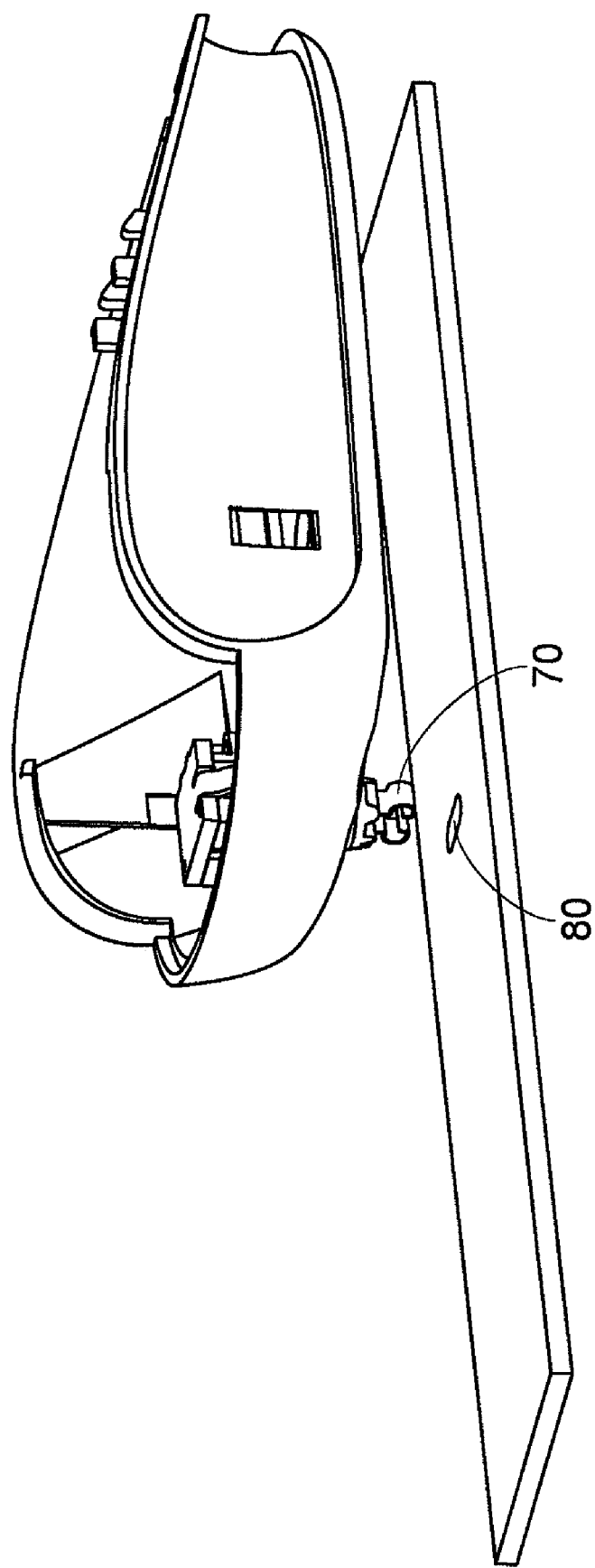
FIG. 3 is a schematic view of a mouse having a storable hook module, which is disclosed in Taiwanese Patent Application No. 94143533.
Figure 8A:
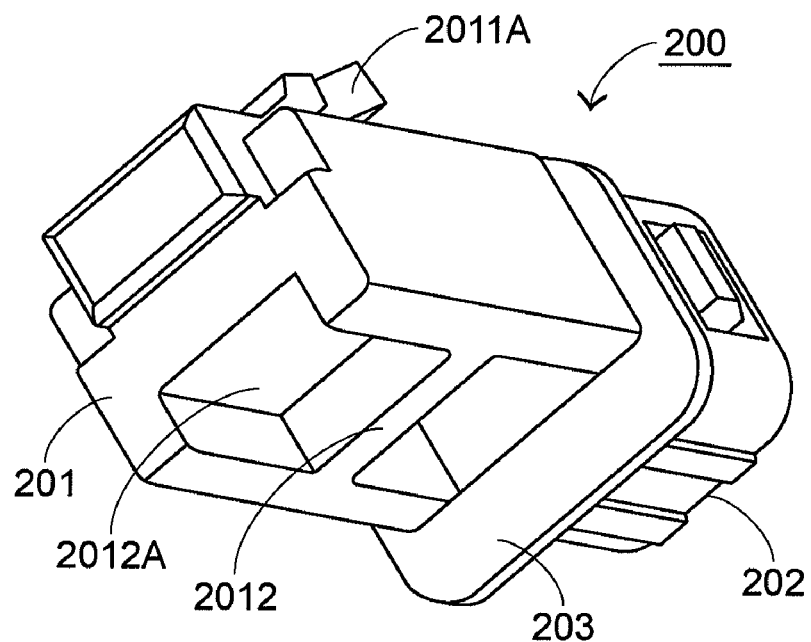
FIG. 8(a) is a schematic perspective view illustrating the connector taken from the viewpoint in the direction of the first terminal.
Figure 8B:
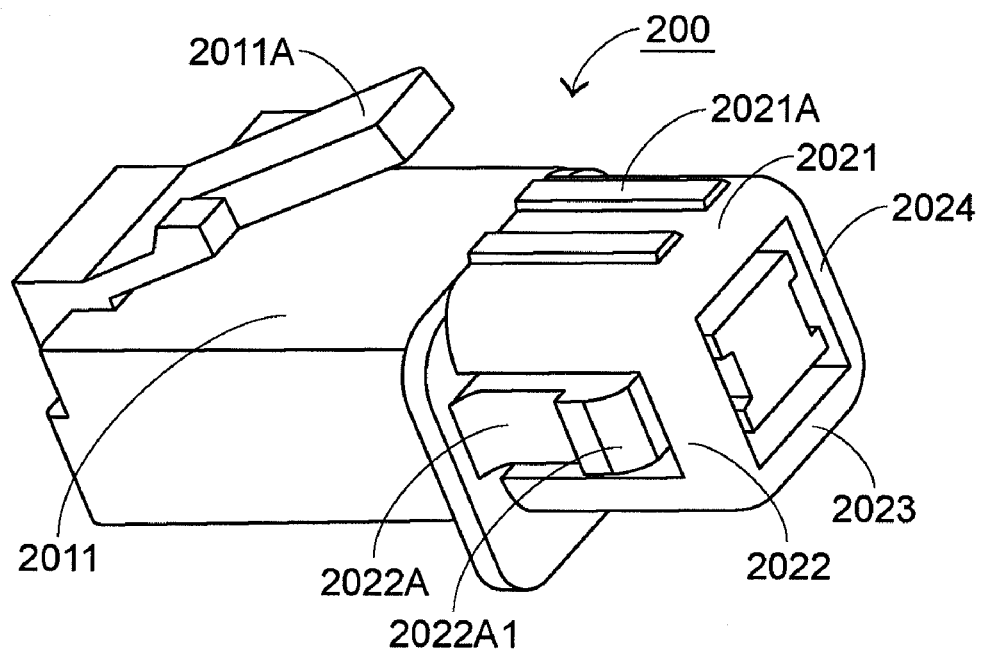
FIG. 8(b) is a schematic perspective view illustrating the connector taken from the viewpoint in the direction of the second terminal.

Please refer to FIGS. 8(a) and 8(b), which are schematic perspective views of the connector 200 as shown in FIG. 2 and taken from the viewpoints in the directions of the first terminal 201 and the second terminal 202, respectively.

In FIGS. 8(a) and 8(b), the connector 200 has an elongated main body 200 including the first terminal 201 and the second terminal 202. The first terminal 201 has a shape mating with the RJ11 port 101, and comprises a first surface 2011 and a second surface 2012. The first surface 2011 and the second surface 2012 are parallel with each other. A resilient arm 2011A is protruded from the first surface 2011. The second surface 2012 has a notch 2012A therein. The second terminal 202 has a shape mating with the recess 301 of the mouse 300, and comprises four lateral sides 2021, 2022, 2023 and 2024. Every two adjacent ones of these lateral sides 2021, 2022, 2023 and 2024 are substantially perpendicular to each other. In addition, a protruding periphery 203 is arranged between the first terminal 201 and the second terminal 202. When the second terminal 202 is inserted into the recess 301 of the mouse 300 such that the protruding periphery 203 is in contact with the mouse 300, the mouse 300 is well attached onto the notebook computer 100.

Moreover, each of the lateral sides 2021 and 2023 has two ribs 2021A, and each of the lateral sides 2022 and 2024 has a resilient sheet 2022A. The resilient sheet 2022A has a hooking part 2022A1.

The configuration and the operation principle of the connector 200 will be described as follows in more details. As described above, the first terminal 201 includes the resilient arm 2011A at the first surface 2011 and has a shape mating with the RJ11 port 101. During the first terminal 201 is inserted into the RJ11 port 101, the resilient arm 2011A is pressed toward the first surface 2011. In response to restoring force of the resilient arm 2011A, the resilient arm 2011A is sustained against the inner wall of the RJ11 port 101 and thus the first terminal 201 is securely engaged with the RJ11 port 101. That is, the mechanism of coupling the first terminal 201 and the RJ11 port 101 is substantially identical to the conventional mechanism of coupling a RJ11 plug with a RJ11 port.

In response to a pulling force applied on the mouse 300, the mouse 300 is disengaged from the second terminal 202 of the connector 200 and thus the mouse 300 will be detached from the notebook computer 100. In order to remove the connector 200 from the RJ11 port 101, the resilient arm 2011A should be pressed toward the first surface 2011 again. Under this circumstance, the resilient arm 2011A is not sustained against the inner wall of the RJ11 port 101 and the first terminal 201 of the connector can be withdrawn from the RJ11 port 101.

As known, the conventional RJ11 plug has electrical contacts to be electrically connected to the corresponding electrical contacts inside the RJ11 port. Since the connector 200 of the present invention is used for facilitating attaching the mouse 300 onto the notebook computer 100, the electrical connection between the connector 200 and the RJ11 port 101 is no longer required. In addition, since the notch 2012A is formed in the second surface 2012 of the first terminal 201, the first terminal 201 will not touch the electrical contacts inside the RJ11 port and thus the probability of damaging the electrical contacts inside the RJ11 port is avoided when the first terminal 201 is inserted into the RJ11 port 101.

Figure 9:
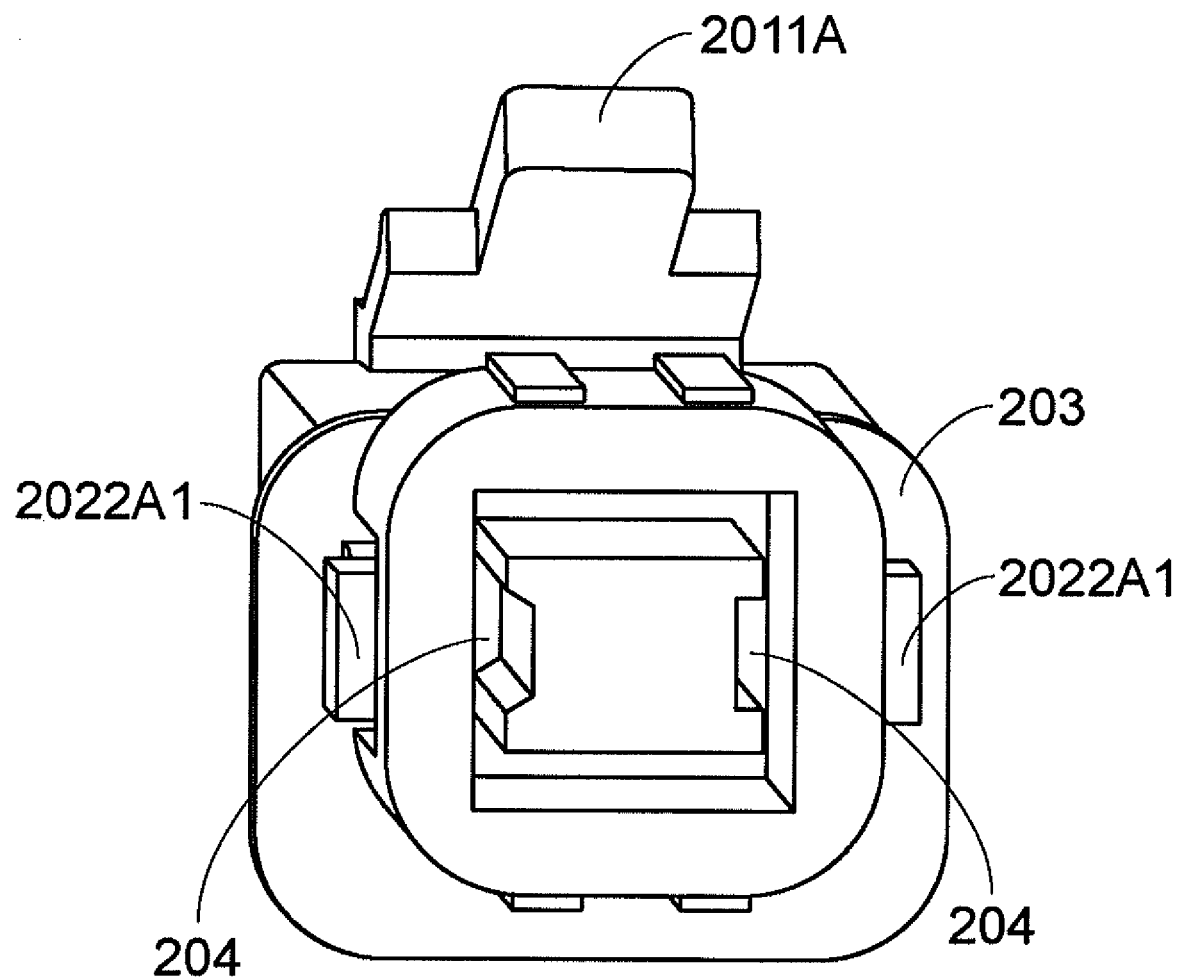
FIG. 9 is a schematic top view illustrating the second terminal of the connector according to the present invention.

As described above, each of the lateral sides 2021 and 2023 has two ribs 2021A, and each of the lateral sides 2022 and 2024 has a resilient sheet 2022A including a hooking part 2022A1. Likewise, the sidewall of the recess 301 of the mouse 300 has corresponding structures mating with the ribs 2021A and the hooking parts 2022A1. As a consequently, the second terminal 202 is firmly engaged with the recess 301 of the mouse 300. Please refer to FIG. 9, which is a schematic top view of the second terminal 202 of the connector 200. As shown in FIG. 9, there a gap 204 in the vicinity of the hooking part 2022A1 at the lateral side 2022 and another gap 204 in the vicinity of the hooking part 2022A1 at the lateral side 2024. During the second terminal 202 is inserted into the recess 301 of the mouse 300, the resilient sheets 2022A are pressed toward the gaps 204 by the inner wall or the recess 301. In response to restoring forces of the resilient sheets 2022A, the resilient sheets 2022A are sustained against the inner wall of the recess 301 and thus the second terminal 202 is securely engaged with the recess 301. Under this circumstance, the mouse 300 is attached onto the notebook computer 100 via the connector 200.

From the above description, the connector of the present invention is advantageous for facilitating attaching the mouse onto the notebook computer by coupling the first terminal of the connector with the RJ11 or RJ45 port. Since the RJ11 or RJ45 port is a common data communication socket of the notebook computer, the connector of the present invention is applicable to all kinds of notebook computers. Since the mechanism of coupling the first terminal and the RJ11 or RJ45 port is substantially identical to the conventional mechanism of coupling the RJ11 or RJ45 plug with a RJ11 or RJ45 port, a secure engagement between the connector and the data communication socket is rendered. Moreover, only one connector of the present invention is sufficient for facilitating attaching the mouse onto the notebook computer. It is preferred that the connector of the present invention is integrally formed into one piece so as to reduce fabricating costs.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector for coupling a computer peripheral device with a RJ11 or RJ45 data communication socket, said computer peripheral device having a rectangular recess, said connector comprising an elongated main body, said main body comprising:
    a first terminal having a shape mating with said data communication socket and including a first surface and a second surface parallel with each other, wherein said first surface has a resilient arm thereon and said second surface has a notch therein; and
    a second terminal having a shape mating with said rectangular recess of said computer peripheral device and including four lateral sides, wherein every two adjacent ones of said four lateral sides are substantially perpendicular to each other.

2. The connector according to claim 1 wherein said main body further comprises a protruding periphery between said first terminal and said second terminal.

3. The connector according to claim 1 wherein said connector is integrally formed into one piece.

4. The connector according to claim 1 wherein said computer peripheral device is a mouse.

5. The connector according to claim 1 wherein each of two lateral sides of said second terminal further comprises two ribs.

6. The connector according to claim 5 wherein each of the other two lateral sides of said second terminal further comprises a resilient sheet including a hooking part.

* * * * *